(12) United States Patent
Kuntz et al.

(10) Patent No.: US 11,560,211 B2
(45) Date of Patent: Jan. 24, 2023

(54) FUSELAGE COMPONENT FOR AN AIRCRAFT, METHOD FOR PRODUCING A FUSELAGE COMPONENT, AND AIRCRAFT

(71) Applicant: Premium Aerotec GmbH, Augsburg (DE)

(72) Inventors: Julian Kuntz, Augsburg (DE); Thomas Geipel, Koenigsbrunn (DE)

(73) Assignee: Premium Aerotec GmbH, Augsburg (DE)

( * ) Notice: Subject to any disclaimer, the term of this patent is extended or adjusted under 35 U.S.C. 154(b) by 453 days.

(21) Appl. No.: 16/720,147

(22) Filed: Dec. 19, 2019

(65) Prior Publication Data

US 2020/0198756 A1   Jun. 25, 2020

(30) Foreign Application Priority Data

Dec. 20, 2018 (DE) ................... 10 2018 222 431.5

(51) Int. Cl.
*B64C 1/12* (2006.01)
*B64C 1/00* (2006.01)
*B64C 1/08* (2006.01)

(52) U.S. Cl.
CPC .................. *B64C 1/12* (2013.01); *B64C 1/08* (2013.01); *B64C 2001/0072* (2013.01)

(58) Field of Classification Search
CPC ........... B64C 1/06; B64C 1/061; B64C 1/068; B64C 1/12; B64C 1/08; B64C 1/064; B64C 1/069; B64C 1/406; B29D 99/0014
See application file for complete search history.

(56) References Cited

U.S. PATENT DOCUMENTS 2,292,372 A * 8/1942 Gerlach ................ B64C 1/06
   52/798.1
5,069,737 A * 12/1991 Guiton ............... B29D 99/0014
   428/179

(Continued)

FOREIGN PATENT DOCUMENTS

DE   10 2006 048 668 A1   4/2008
DE   10 2009 056 995 A1   6/2011

(Continued)

OTHER PUBLICATIONS

German Office Action for Application No. 10 2018 222 431.5 dated Aug. 13, 2019.

(Continued)

*Primary Examiner* — Richard R. Green
*Assistant Examiner* — Madison Elizabeth Dittner
(74) *Attorney, Agent, or Firm* — Jenkins, Wilson, Taylor & Hunt, P.A.

(57) ABSTRACT

A fuselage component for an aircraft, including a shell part composed of a fiber composite material and a stiffening structure which is connected to an inner surface of the shell part and has shaped parts composed of a fiber composite material, wherein the shaped parts each have a flat base section which extends along the inner surface of the shell part, and a step-shaped profile edge which extends in an encircling manner around the base section. The shaped parts are arranged in the form of parquetry with overlapping profile edges. As a result, the overlapping profile edges form stiffening profiles intersecting at an intersection. Furthermore, an aircraft which has at least one such fuselage component and a method for producing a fuselage component are described.

16 Claims, 7 Drawing Sheets

(56) References Cited

U.S. PATENT DOCUMENTS

| | | | |
|---|---|---|---|
| 5,888,608 A * | 3/1999 | Tsai | E04C 5/07 |
| | | | 428/116 |
| 6,110,567 A | 8/2000 | Bird | |
| 8,493,554 B2 * | 7/2013 | Arnold | B64C 1/064 |
| | | | 356/3.01 |
| 8,622,347 B2 * | 1/2014 | Oyzerskiy | B23P 11/00 |
| | | | 244/119 |
| 9,138,958 B2 | 9/2015 | Goehlich et al. | |
| 9,180,960 B2 * | 11/2015 | Rosman | B32B 5/12 |
| 9,586,667 B2 * | 3/2017 | Reeves | B64C 1/069 |
| 10,124,541 B2 * | 11/2018 | Barlag | B29C 70/28 |
| 10,196,124 B2 * | 2/2019 | Vazquez Castro | B64C 1/064 |
| 11,014,331 B2 * | 5/2021 | Gurvich | E04C 2/3405 |
| 2004/0035979 A1 * | 2/2004 | McCoskey, Jr. | B64C 1/12 |
| | | | 244/117 R |
| 2009/0320398 A1 | 12/2009 | Gouvea | |
| 2013/0139961 A1 * | 6/2013 | Gear | B29C 33/505 |
| | | | 156/247 |
| 2019/0161154 A1 * | 5/2019 | Linde | B64C 1/069 |
| 2020/0189711 A1 * | 6/2020 | Mialhe | B64C 1/061 |

FOREIGN PATENT DOCUMENTS

| | | |
|---|---|---|
| DE | 10 2009 057 006 A1 | 6/2011 |
| DE | 10 2011 085937 A1 | 5/2013 |
| EP | 0 749 825 A2 | 12/1996 |
| EP | 3 205 491 A1 | 8/2017 |
| GB | 2110736 A * | 6/1983 ........... B29C 70/342 |

OTHER PUBLICATIONS

European Search Report for Application No. 19217452.2 dated Jun. 5, 2020.

* cited by examiner

FUSELAGE COMPONENT FOR AN AIRCRAFT, METHOD FOR PRODUCING A FUSELAGE COMPONENT, AND AIRCRAFT

CROSS-REFERENCE TO RELATED APPLICATION

This application claims priority to German Patent Application Serial No. 10 2018 222 431.5 filed Dec. 20, 2018, the entire disclosure of which is incorporated by reference herein.

TECHNICAL FIELD

The disclosure herein relates to a method for producing a fuselage component for an aircraft, to a fuselage component for an aircraft, and to an aircraft.

BACKGROUND

Shell-shaped components composed of a fiber composite material are frequently used for producing a fuselage structure of an aircraft. The components typically have a shell part or skin element of flat extent and stiffening profiles which are connected to the shell part and form a grid-shaped stiffening structure. In this connection, i.e. when such components are realized in a fiber composite design, generally both the shell part and the stiffening profiles are formed from a fiber composite material.

In order to produce such components, DE 10 2009 057 006 A1 proposes a method in which first of all strip elements composed of a fiber material are placed into grooves formed on a mould part, the grooves running in a manner corresponding to a reinforcing-structure grid shape to be produced. The respective strip elements end at intersections of the grooves, at which in each case two grooves intersect, and an intersecting part connecting the respective strip elements is inserted. A flat semi-finished fiber product is formed on the mould part by fiber tapes being laid by an Automated Fiber Placement (AFP) process. Subsequently, a pressure plate is placed onto the semi-finished fiber product, and the semi-finished fiber product and the strip elements are infiltrated with a matrix material, and the matrix material is cured.

DE 10 2006 048 668 A1 describes a method for producing structural components with a flat skin zone and a stiffening structure applied to the skin zone, wherein the stiffening structure has at least two stiffening profiles composed of a fiber composite material and having a common intersecting point. The stiffening profiles are draped here onto the skin zone, wherein transition surfaces are formed which are designed in such a manner that a continuous arrangement of reinforcing fibers that is appropriate to the flow of force is made possible.

US 2009/0320398 A1 describes a method for producing a structural component for an aircraft, wherein intersections of a grid-shaped reinforcing structure are assembled by four partial profiles. In order to improve the transmission of load beyond the intersection, tape elements are provided which extend beyond the intersections.

In addition, U.S. Pat. No. 6,110,567 A describes a fiber composite component with a flat shell part and a stiffening structure having intersecting Ω-shaped stiffening profiles, wherein the stiffening structure as a whole is adhesively bonded to the shell part.

SUMMARY

It is an object of the disclosure herein to provide a fuselage component for an aircraft, which can be produced in a simple and efficient manner, and to provide an improved method for producing a fuselage component.

This object is achieved in each case by the subject matter disclosed herein.

Advantageous refinements and developments emerge from the description herein.

According to a first aspect of the disclosure herein, a fuselage component is provided for an aircraft. The fuselage component has a shell part of flat extent and composed of a fiber composite material, and a stiffening structure which is connected to an inner surface of the shell part. The stiffening structure has a multiplicity of shaped parts composed of a fiber composite material. The shaped parts each have a flat, for example polygonal, base section which extends along the inner surface of the shell part, and a step-shaped profile edge which extends in an encircling manner around the base section. The shaped parts are arranged in the form of parquetry with overlapping profile edges, wherein the overlapping profile edges form stiffening profiles intersecting at an intersection.

One of the concepts of the disclosure herein involves forming a stiffening structure from a multiplicity of trough-shaped, for example rectangular shaped parts, wherein step-shaped edge regions of shaped parts adjacent to one another overlap. The overlapping of in each case two step-shaped edge regions defines a cross-sectional shape, in particular an Ω-shaped cross-sectional shape of a respective stiffening profile. An arrangement of the shaped parts as parquetry, that is to say as an arrangement of shaped parts which are adjacent to one another without a gap, wherein the edge regions at least partially overlap, results in the formation of a stiffening structure with intersecting stiffening profiles. Such a stiffening structure can be produced in a particularly simple manner since the shaped parts are each of identical construction. The intersections are likewise formed by overlapping of the profile sections and can thereby be produced very efficiently.

According to one embodiment of the fuselage component, a load-bearing tape is connected to each stiffening profile and extends beyond the intersection. The load-bearing tapes are formed from a fiber composite material and can have, for example, unidirectionally arranged reinforcing fibers. The load-bearing tapes are provided beyond the intersections for additional stiffening. In particular, the load-bearing tapes have reinforcing fibers which extend beyond the intersections and are embedded in a matrix material. The transmission of load beyond the intersections is thereby improved.

According to one embodiment of the fuselage component, the base sections of the shaped parts are of rectangular design. The profile edge of a respective shaped part in each case has two mutually opposite first profile sections which extend in a first direction, and two mutually opposite second profile sections which extend between the first profile sections in a second direction. The first profile sections of in each case two shaped parts that are adjacent in the second direction overlap in such a manner that they form a first stiffening profile extending in the first direction. Furthermore, the second profile sections of in each case two shaped parts that are adjacent in the first direction overlap in such a manner that they form a second stiffening profile which extends in a second direction and intersects the first stiffening profile at an intersection.

Optionally, a load-bearing tape is connected to each of the overlapping first profile sections and extends beyond the intersection. Furthermore, a load-bearing tape is connected to each of the overlapping second profile sections and extends beyond the intersection. The rectangular design of the base sections of the shaped parts facilitates in particular the production of the shaped parts by deformation of a semi-finished fiber product, which further facilitates the production of the fuselage component.

According to one embodiment of the fuselage component, the stiffening structure is formed at least in regions with a plurality of layers lying one on top of another of shaped parts, wherein the profile edges of adjacent shaped parts of a respective layer overlap, and wherein a respective load-bearing tape is arranged between two adjacent layers, the load-bearing tape extending on the profile edges beyond the intersection. Accordingly, a plurality or shaped parts can also be arranged one above another in order to form a plurality of layers. The formation of the stiffening structure with multiple layers at least in regions further improves the mechanical strength of the fuselage component.

Optionally, at least one load-bearing tape is in each case arranged between the overlapping profile edges of a layer and the overlapping profile edges of a layer lying thereabove. The rigidity is thereby further increased.

According to a further embodiment, the stiffening structure has a flat covering layer composed of a fiber composite material, wherein the covering layer lies against the shaped parts and optionally against the load-bearing tapes and has recesses in the region of the intersections. The shaped parts are therefore arranged between the shell part and the covering layer, wherein the covering layer lies flat against the shaped parts. The covering layer can be adapted more simply to the topography of the shaped parts by the recesses of the covering layer. The covering layer affords the advantage that the load-bearing tapes and the shaped parts are protected against damage.

According to a further embodiment, the fuselage component has a foam core which is arranged between the stiffening profiles and the shell part. The foam core therefore fills the cross section of the stiffening profiles that is defined by the profile sections. This facilitates in particular the production of the fuselage component. Furthermore, the foam core as a whole increases the mechanical strength of the fuselage component. The foam core can be formed integrally or can be assembled from a plurality of foam core parts.

According to a further embodiment, the fuselage component has a connection structure which is connected to one of the stiffening profiles and has a tab projecting from the stiffening profile. Accordingly, a structure having a tab which serves for the attachment of further components, such as, for example, interior trim parts or the like, is fastened to one of the stiffening profiles. The connection structure can be formed, for example, from a fiber composite material. For the fastening, the connection structure can be, for example, adhesively bonded to the shaped parts or integrally formed thereon.

According to a further embodiment, the fuselage component has a connecting strip which is connected to the inner surface of the shell part, extends along a circumferential edge of the shell part and projects above the latter. For example, the connecting strip can be formed from a thermoplastic fiber composite material or can comprise a thermoplastic material.

According to a further embodiment, the fuselage component has a profile coupling structure which is connected to one of the stiffening profiles and protrudes beyond an end of the respective stiffening profile with respect to the longitudinal extent of the respective stiffening profile. The profile coupling structure therefore protrudes beyond an end of the respective stiffening profile in the first or the second direction, depending on whether the profile coupling structure is attached to a first or second stiffening profile. The profile coupling structure serves for the coupling of fuselage components different from stiffening profiles, for example in a fuselage structure of an aircraft.

The profile coupling structure can be formed, for example, as a strip or a tab composed of a fiber composite material, for example a thermoplastic fiber composite material, and is, for example, integrally formed on the respective stiffening profile or adhesively bonded thereto.

According to a further aspect of the disclosure herein, an aircraft is provided with a fuselage, wherein the fuselage has at least one fuselage component according to one of the embodiments described above. The fuselage can have, for example, an approximately cylindrical cross-sectional shape which is formed by a plurality of fuselage components, wherein the inner surface of the shell part of a respective fuselage component has a concave curvature.

According to a further aspect of the disclosure herein, a method for producing a fuselage component is provided. In one step of the method, a stiffening structure is formed from a multiplicity of shaped parts composed of a fiber composite material or semi-finished fiber composite product and each having a flat base section and a step-shaped profile edge, wherein the profile edges of in each case two shaped parts are arranged overlapping in such manner that they form a stiffening profile. Furthermore, an inner surface of a shell part of flat extent and composed of a fiber composite material is placed onto the base sections of the shaped parts of the stiffening structure, and the shell part and the stiffening structure are connected.

This aspect of the disclosure herein is based on the concept of forming a stiffening structure from a multiplicity of flat shaped parts which have a step-shaped edge region by the shaped parts being arranged in such a manner that the edge regions of in each case two shaped parts overlap. The overlapping of two step-shaped edge regions or profile edges defines a cross-sectional shape, in particular an $\Omega$-shaped cross-sectional shape of a respective stiffening profile. A stiffening structure can thereby be advantageously constructed from a multiplicity of identical shaped parts. This accelerates the formation of the stiffening structure. The stiffening structure formed in such a manner is connected to a flat shell part, in particular an inner surface of the shell part is placed onto a flat base section of the shaped parts and connected to the base sections, for example, in an integrally bonded manner. A particularly stable construction is obtained by the flat connection. It is possible, for example, for semi-finished prepreg products to be used as the fiber composite material or semi-finished product, i.e. semi-finished products composed of a fiber composite material in which reinforcing fibers are impregnated with a matrix material or are already embedded therein. Alternatively, dry fiber mats can also be used as the semi-finished product.

According to one embodiment of the method, the profile edge extends in an encircling manner around the base section, wherein the shaped parts are arranged in the form of parquetry in such a manner that profile edges overlap and form stiffening profiles intersecting at an intersection. Optionally, a load-bearing tape is connected to each stiffening profile and extends beyond the intersection. Accordingly, the shaped part is designed as a trough-shaped component with a step-shaped profile edge which extends in an encircling manner around the base section. This design permits an arrangement of the shaped parts in parquetry and thereby permits the particularly rapid and simple formation of intersections between first and second stiffening profiles.

According to one embodiment of the method, the base sections of the shaped parts are of rectangular design, wherein the profile edge has two mutually opposite first profile sections which extend in a first direction, and two mutually opposite second profile sections which extend between the first profile sections in a second direction, wherein the first profile sections of in each case two shaped parts are arranged overlapping in such a manner that they form a first stiffening profile extending in the first direction, wherein the second profile sections of in each case two shaped parts are arranged overlapping in such a manner that they form a second stiffening profile which extends in the second direction and intersects the first stiffening profile at the intersection. Optionally, load-bearing tapes composed of a fiber composite material and each extending beyond the intersections are connected to the first profile sections and to the second profile sections.

According to a further embodiment, for supporting the stiffening structure, a foam core is arranged between the stiffening profiles and the shell part. The foam core thereby facilitates in particular connecting of the shaped parts to the shell part since deformations of the shaped parts that may occur during the application of a force for connecting the shaped parts to the shell part can be avoided by the foam core. If the stiffening profiles are hardened, for example, together with the shell part in a vacuum bag or the like, the foam core supports the stiffening profiles.

According to a further embodiment, the shaped parts are arranged as semi-finished fiber products on the shell part and, following the arrangement, are infiltrated with a matrix material. The shaped parts here can each contain one or more layers of reinforcing fibers. The shell part can optionally also be present as a fiber mat. The reinforcing fibers are embedded in the matrix material by infiltration. Since the shaped parts are present as dry mats, the deformation of the shaped parts in order to produce the profile edge is facilitated. For connecting shell part and shaped parts, the arrangement which is formed can be consolidated by application of a compression pressure, for example by setting a temperature at which the matrix material hardens or solidifies. A thermoset material or a thermoplastic material can be used as the matrix material.

According to a further embodiment, the shaped parts are arranged as semi-finished products composed of a fiber composite material, which has reinforcing fibers embedded in a matrix material, on the shell part. The shaped parts are accordingly designed as prepreg components or semi-finished prepreg product. For connecting the shaped part and shaped parts, the arrangement which is formed can be consolidated by application of a compression pressure, for example by setting a temperature at which the matrix material hardens or solidifies. A thermoset material or a thermoplastic material can be used as the matrix material. In the case of a thermoplastic matrix material, a temperature which lies above the melting point of thermoplastic matrix material has to be set before the consolidation. The shell part can optionally also be present as a semi-finished prepreg product.

The shell part and the stiffening structure can therefore be connected, for example, by joint curing of the shell part and of the stiffening structure, if semi-finished prepreg products are used as the fiber composite material. Alternatively, the shell part and the stiffening structure can be jointly infiltrated with resin or matrix material and cured. Furthermore, it is also conceivable to connect the stiffening structure and the shell part by adhesive bonding, in particular if thermosetting materials are used. If thermoplastic semi-finished fiber composite products are used, the connection can also take place by welding or co-consolidation.

According to a further embodiment of the method, the formation of the stiffening structure optionally comprises placing the load-bearing tapes into depressions which are formed in a contour surface of a mould. Furthermore, the shaped parts are laid onto the contour surface in such a manner that the profile sections overlap in the depressions and one of the overlapping profile sections lies against the load-bearing tape which is optionally placed in the respective depression. The shell part is placed with the inner surface onto the stiffening structure. Optionally, before the shell part is placed onto the stiffening structure, a foam core is placed onto the profile sections in the depressions. Placing of the load-bearing tapes into depressions reliably fixes them in their position. The formation of the stiffening structure on the contour surface of a mould which has depressions, the profile of which corresponds to the stiffening profiles to be produced, affords the advantage that precise positioning of the shaped parts is facilitated.

With regard to directional indications and axes, in particular directional indications and axes relating to the profile of physical structures, a path of an axis, of a direction or of a structure "along" another axis, direction or structure is understood here as meaning that these, in particular the tangents that arise at a respective point of the structures, run in each case at an angle of less than 45 degrees, preferably less than 30 degrees, and particularly preferably parallel, to one another.

With regard to directional indications and axes, in particular directional indications and axes relating to the profile of physical structures, a path of an axis, of a direction or of a structure "transversely" with respect to another axis, direction or structure is understood here as meaning that these, in particular the tangents that arise at a respective point of the structures, run in each case at an angle of greater than or equal to 45 degrees, preferably greater than or equal to 60 degrees, and particularly preferably perpendicular, to one another.

Here, a "fiber material" or a "fiber composite material" is understood in general to mean a material which comprises a multiplicity of reinforcing fibers, in particular in the form of threads or pieces of thread, such as, for example, carbon, glass, ceramic, aramid, boron, mineral, natural or synthetic fibers or mixtures thereof. The fiber material can in particular also be impregnated with a resin or matrix material, such as, for example, with a thermosetting, thermoplastic or elastomer resin or in general a synthetic resin or the like.

BRIEF DESCRIPTION OF THE DRAWINGS

The disclosure herein will be explained below with reference to the figures of the drawings. In the figures.

In the figures, the same reference signs denote identical or functionally identical components, unless stated otherwise.

DETAILED DESCRIPTION

Figure 13:
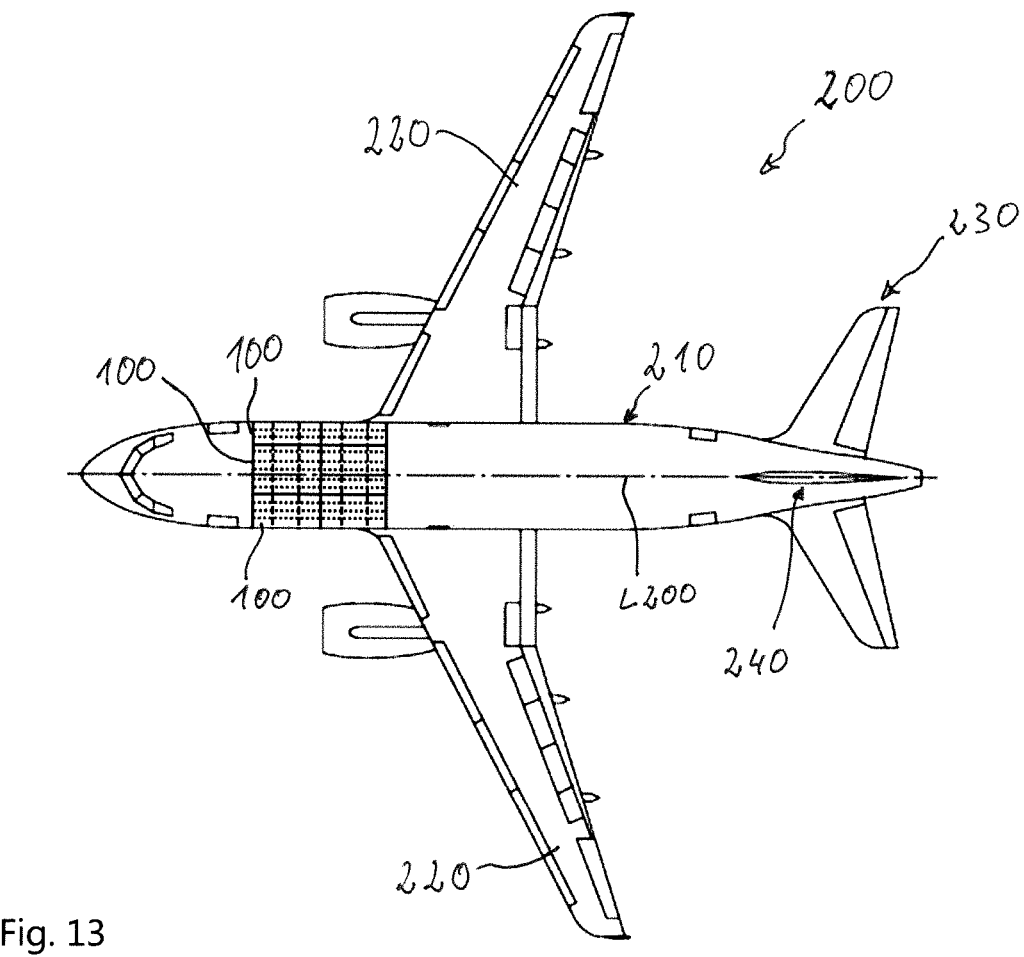
FIG. 13 shows a schematic illustration of an aircraft according to an example embodiment of the disclosure herein in a top view.

FIGS. 1 through 4 show by way of example and schematically a method for producing a fuselage component 100 for an aircraft 200. FIG. 5 shows by way of example a fuselage component 100. FIG. 13 shows an aircraft 200 comprising a fuselage component 100.

As FIG. 5 illustrates, the fuselage component 100 has a shell part 1 and a stiffening structure 2. The shell part 1 is realized as a flat, in particular plate-like or shell-shaped component. The shell part 1 has an inner surface 1a and an outer surface 1b placed opposite the latter. The shell part 1 can have in particular a constant or a substantially constant cross-sectional thickness t1. As illustrated by way of example in FIG. 5, the shell part 1 can have a curved extent. For example, the inner surface 1a of the shell part can be curved concavely, as shown in FIG. 5. The shell part 1 is formed from a fiber composite material. As illustrated by way of example in FIGS. 6 and 7, the shell part 1 can have a plurality of fiber layers 13 which are embedded in a matrix material.

The stiffening structure 2 is connected, for example connected in an integrally bonded manner, to the inner surface 1a of the shell part 1. The stiffening structure 2 illustrated by way of example in FIG. 5 has first stiffening profiles 21 and second stiffening profiles 22 which extend transversely with respect to the first stiffening profiles 21 and intersect the latter at an intersection 20. The stiffening structure 2 illustrated by way of example in FIG. 5 is formed from a multiplicity of shaped parts 3 and optional load-bearing tapes 4.

Figure 2:
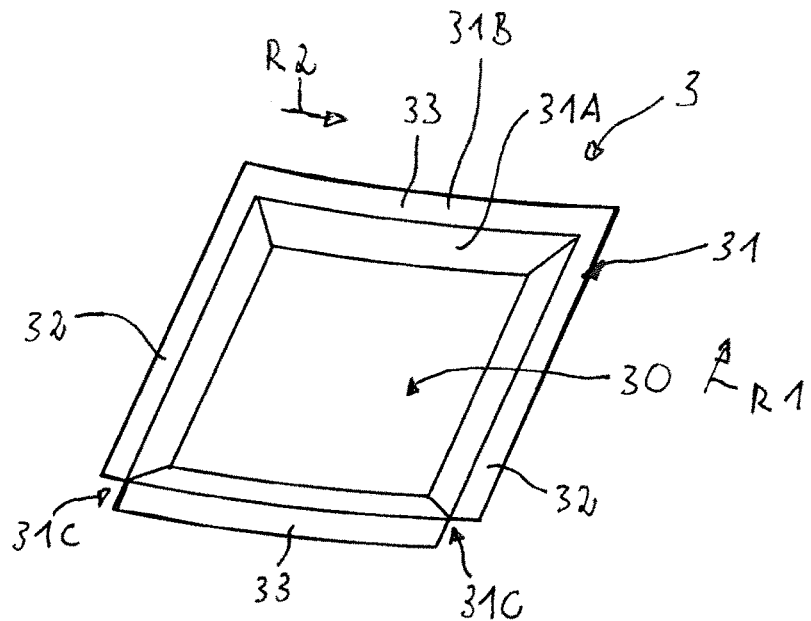
FIG. 2 shows a schematic illustration of a shaped part in a perspective view for use in a method according to an example embodiment of the disclosure herein.

FIG. 2 shows by way of example a shaped part 3. The shaped part 3 has a flat base section 30 and a profile edge 31.

The base section 30 can in particular have a curvature corresponding to the curvature of the inner surface 1a of the shell part 1. The shaped part 3 illustrated by way of example in FIG. 2 has a rectangular base section 30. In principle, other polygonal shapes of the base section 30 are also conceivable.

The profile edge 31 of the shaped part 3 extends in a step-shaped manner from the base section 30. This results in a trough-shaped design of the shaped part 3, as illustrated by way of example in FIG. 2. In order to form the step shape, the profile edge 31 has a wall section 31A extending transversely with respect to the base section and a web section 31B protruding outwards from the wall section 31A. The profile edge 31 can extend in particular in an encircling manner around the base section 30, as illustrated by way of example in FIG. 2. In the case of the shaped part 3 illustrated by way of example in FIG. 2 and having a rectangular base section 30, the profile edge in each case has two mutually opposite first profile sections 32 which extend in a first direction R1 and two mutually opposite second profile sections 33 which extend between the first profile sections 32 in a second direction R2. As is furthermore shown in FIG. 2, the web section 31B can have an interruption 31C in the region of a corner. In FIG. 2, the web section 31B, for example, has an interruption 31C at two mutually opposite corners.

The profile edge 31 and the base section 30 of the shaped part 3 are formed integrally. In particular, the shaped part 3 can be designed as a fiber composite component which has one or more layers of reinforcing fibers which are embedded in a matrix material.

Figure 1:
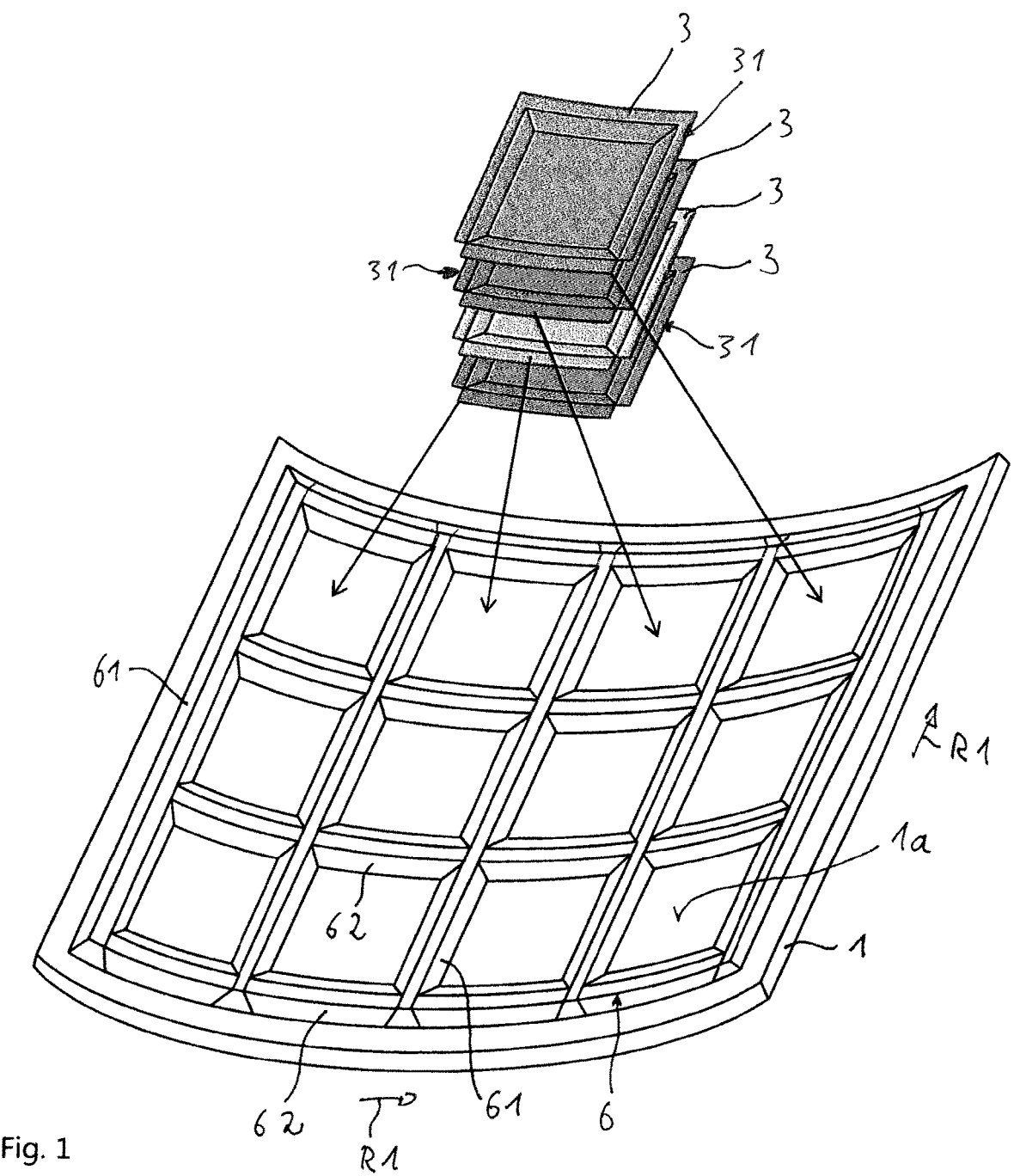
FIG. 1 shows a schematic view of a method for producing a fuselage component according to an example embodiment of the disclosure herein, wherein a formation of a reinforcing structure is illustrated in the step.

FIG. 1 shows by way of example a step of a method for producing the fuselage component 100, in which the stiffening structure 2 is formed. For this purpose, the profile edges 31 of in each case two shaped parts 3 are arranged overlapping. By the step-shaped design of the profile edge 31, the overlapping profile edges 31 form a stiffening profile 21, 22, in particular a stiffening profile 21, 22 with an Ω-shaped cross section, as can be seen in particular in the sectional views shown in FIGS. 6 and 7.

It is illustrated by way of example in FIG. 1 that a multiplicity of identical shaped parts 3, as are illustrated by way of example in FIG. 2, are arranged in the form of parquetry in order to form the stiffening structure 2, and therefore profile edges 31 overlap and form stiffening profiles 21, 22 intersecting at an intersection 20. In the arrangement, illustrated by way of example, of shaped parts 3 with rectangular base sections 30, the first profile sections 32 of in each case two shaped parts 3 are arranged overlapping in such a manner that they form a first stiffening profile 21 extending in the first direction R1. The second profile sections 33 of in each case two shaped parts 3 are furthermore arranged overlapping in such a manner that they form a second stiffening profile 22 which extends in the second direction R2 and intersects the first stiffening profile 21 at the intersection 20.

For the production of the fuselage component 100, the shaped part 3 can be present as a dry semi-finished fiber product, i.e. in the form of a fiber mat without matrix material. Alternatively, the shaped part 3 can also be present as a preform in the form of a semi-finished prepreg product in which the reinforcing fibers are embedded in a matrix material.

The base sections 30 of the shaped parts 3 and the inner surface 1a of the shell part 1 are placed on one another. This can take place, for example, at the same time as the formation of the reinforcing structure 2 by the shaped parts 3 being placed onto the inner surface 1a of the shell part 1, as illustrated by way of example in FIG. 1. After the base sections 30 and the inner surface 1a are placed on one another, the base sections 30 extend along the inner surface 1a of the shell part 1.

A foam core 6 is optionally arranged between the stiffening profiles 21, 22 and the shell part 1. It is illustrated by way of example in FIG. 1 that the foam core 6 has a profile corresponding to the profile of the stiffening profiles 21, 22 and is arranged on the inner surface 1a of the shell part 1. The foam core 6 serves in particular for supporting the stiffening structure 2 or the shaped parts 3 during the production of the fuselage component 100. At the same time, the foam core 3 can also contribute to improving the mechanical rigidity of the fuselage component 100. The foam core 6 can be produced in particular from a polymethacrylimide foam. The foam core 6 is preferably assembled from a plurality of core parts 61, 62 which are coupled to one another in a form-fitting manner, for example by plug-in connections (not illustrated). FIG. 1 illustrates by way of example a foam core 6 which has continuous first core parts 61 extending in the first direction R1 and second core parts 62 which each extend in the second direction R2 between two consecutive first core parts 61.

Figure 3:
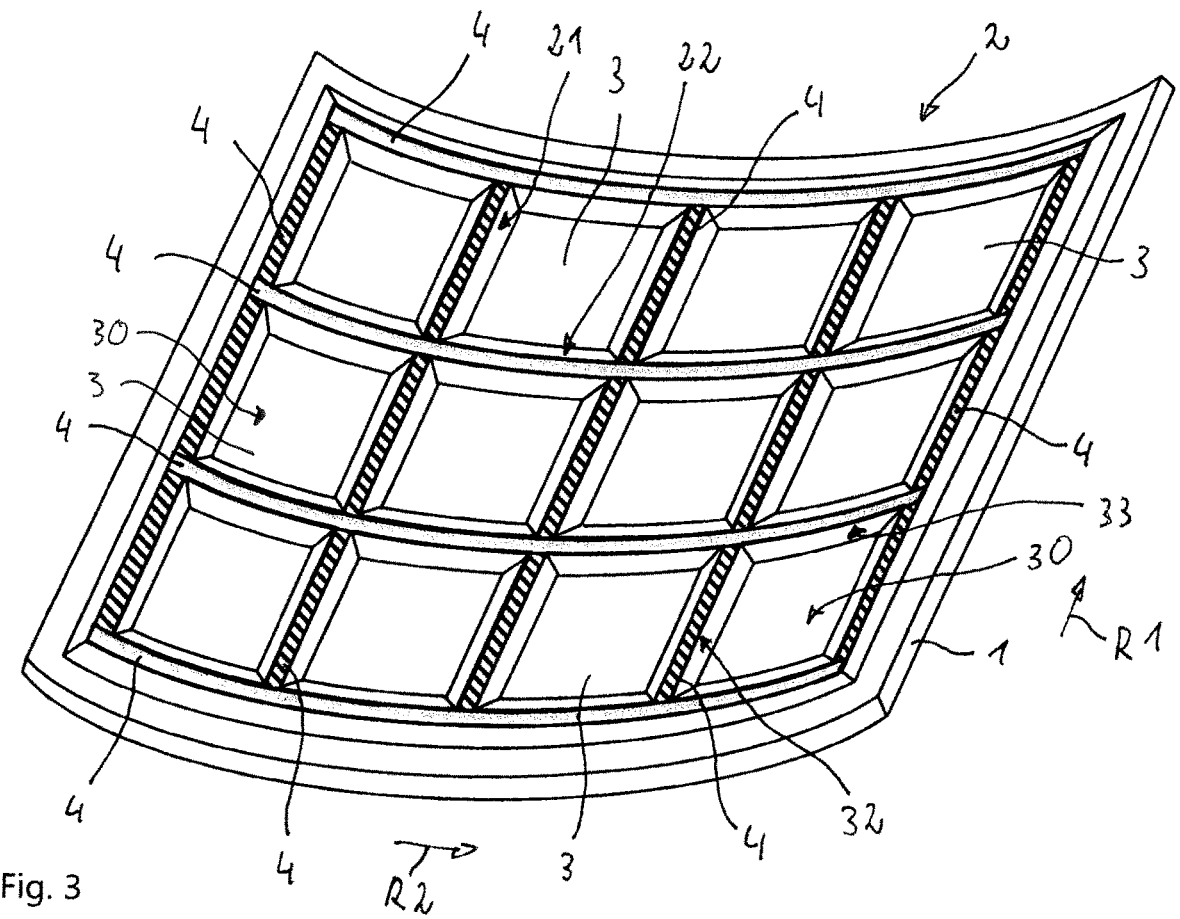
FIG. 3 shows a further step of the method for producing a fuselage component according to an example embodiment of the disclosure herein, wherein the laying of load-bearing tapes is illustrated schematically.

FIG. 3 shows an optional step of the method for producing the fuselage component 100. In the event that a stiffening structure 2 has been formed with intersecting stiffening profiles 21, 22 of shaped parts 3 with profile edges 31 extending in an encircling manner around the base section 30, load-bearing tapes 4 are also arranged. The load-bearing tapes 4 can be in particular fiber tapes having unidirectionally extending reinforcing fibers.

As illustrated by way of example in FIG. 3, the optional load-bearing tapes 4 are arranged on the reinforcing profiles 21, 22 formed by the overlapping profile edges 31. In the arrangement, illustrated by way of example in FIG. 3, of the shaped parts 3 as parquetry from shaped parts 3 with a rectangular base section 30, a load-bearing tape 4 is arranged on each of the overlapping first profile sections 32 and a load-bearing tape 4 is arranged on each of the overlapping second profile sections 33. As illustrated in FIG. 3, the load-bearing tapes 4 extend continuously over the entire longitudinal extent of a respective reinforcing profile 21, 22 formed by the overlapping profile edges 31. In general, the load-bearing tapes 4 extend beyond the intersections 20. Since the shaped parts 3 each end at the intersections 20, reinforcing fibers extending beyond the intersections 20 are provided in the stiffening structure 2 by the load-bearing tapes 4, which improves the transmission of force beyond the intersections 20.

Figure 4:
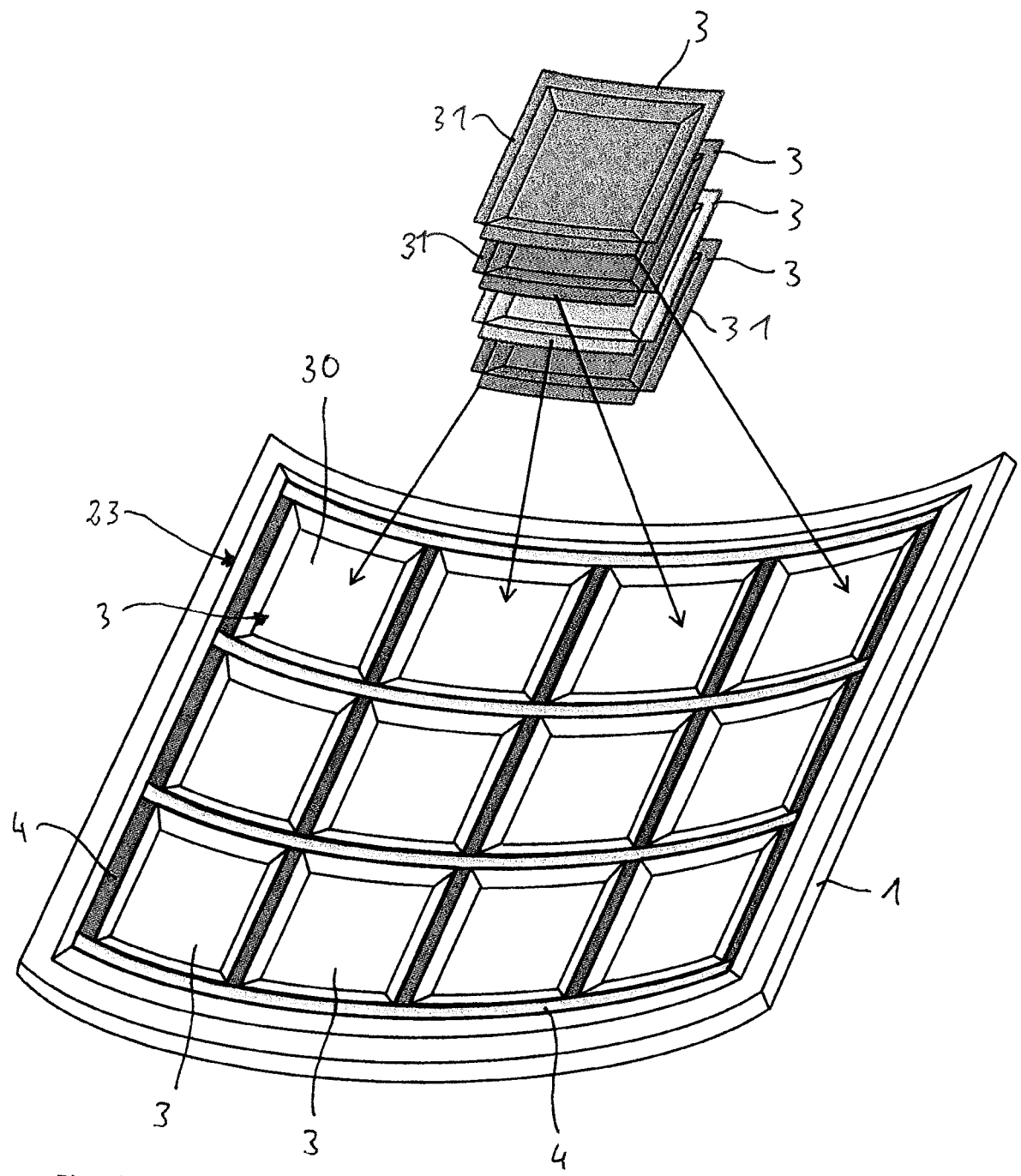
FIG. 4 shows a further step of the method for producing a fuselage component according to an example embodiment of the disclosure herein, wherein the laying of an additional layer of shaped parts is illustrated schematically.
Figure 5:
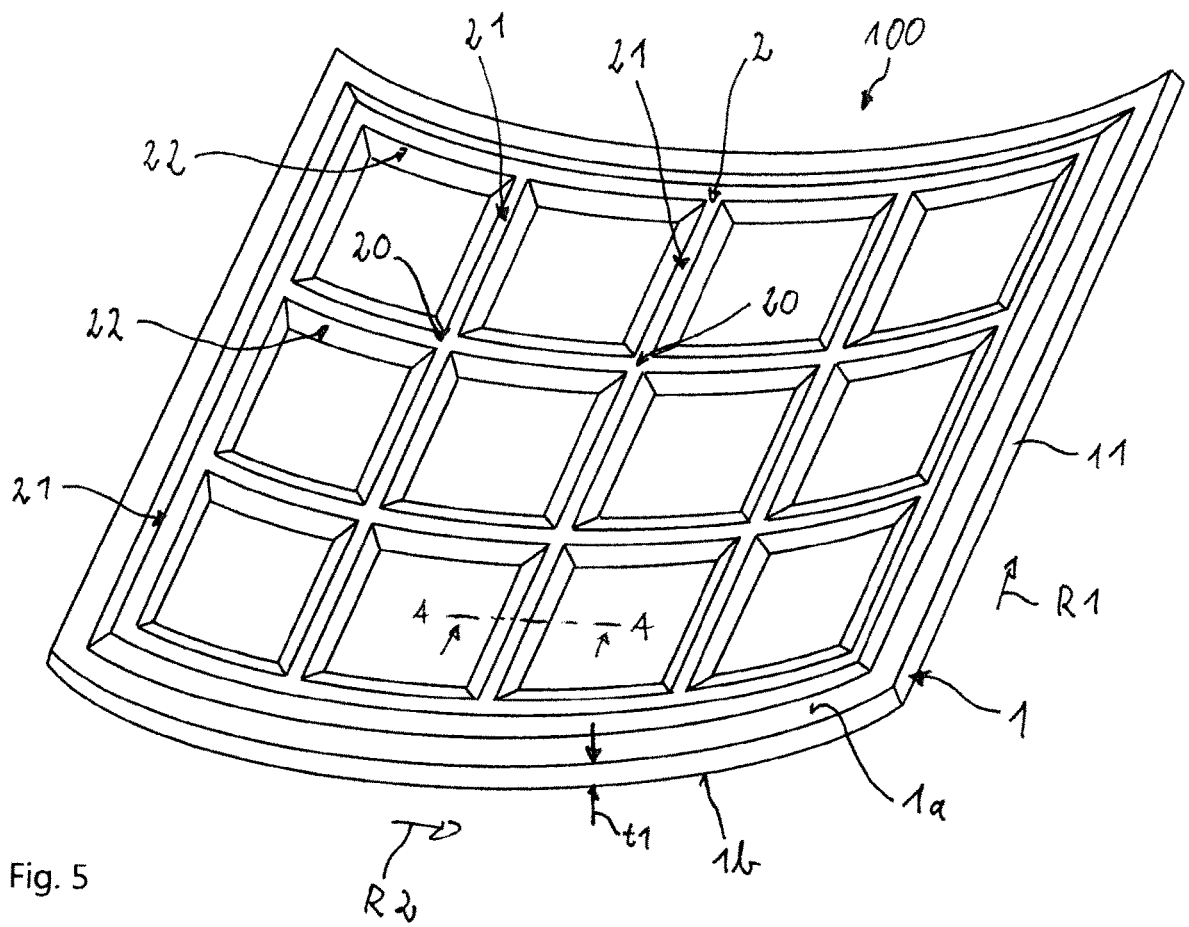
FIG. 5 shows a schematic illustration of a fuselage component according to an example embodiment of the disclosure herein in a perspective view.

FIG. 4 shows an optional further step of the method. In this step, a further layer 23 of shaped parts 3 is formed. For this purpose, the base sections 30 of further shaped parts 3 and the base sections 30 of the already existing layer 23 of the shaped parts 3 are placed on one another, as is illustrated by way of example in FIG. 4. The shaped parts 3 can be arranged here, in particular as described above, with overlapping profile edges 31. In principle, it is conceivable for a further layer 23 of shaped parts 3 to be formed only on a partial region of the already existing layer 23. As is illustrated by way of example in FIG. 4, the optionally provided load-bearing tapes 4 are arranged between two adjacent layers 23. Optionally, further load-bearing tapes 4 can be arranged on the further layer 23, as described above, in particular also merely in regions or at individual intersections 20.

In a further method step (not illustrated), the shell part 1 and the stiffening structure 2 are connected to each other. If dry semi-finished fiber products are used as the shaped parts 3, shell part 1 and stiffening structure 2 can be connected, for example, by the shaped parts 3, following the arrangement on the shell part 1, being infiltrated with a matrix material and the matrix material subsequently being consolidated. For example, thermoplastic or thermosetting matrix material can be used. The shell part 1 and the load-bearing tapes 4 are optionally also provided as dry semi-finished fiber products and are infiltrated at the same time with the shaped parts 3. If the shaped parts 3 as semi-finished products composed of a fiber composite material which has reinforcing fibers embedded in a matrix material are arranged together with the shell part 1, the connection can take place by a consolidation step of the matrix material. In the case of thermoplastic matrix materials, this requires heating of the matrix material to a temperature above the melting point of the matrix material and, by application of a compression pressure, cooling of the matrix material to a solidification temperature below the melting point. Alternatively, in the case of thermoplastic matrix materials, shell part 1 and stiffening structure 2 can also be welded. In the case of thermosetting thermoset matrix materials, the temperature is set by application of a compression pressure to an activation temperature of the matrix material, in which a hardening reaction of the matrix material is activated.

Figure 6:
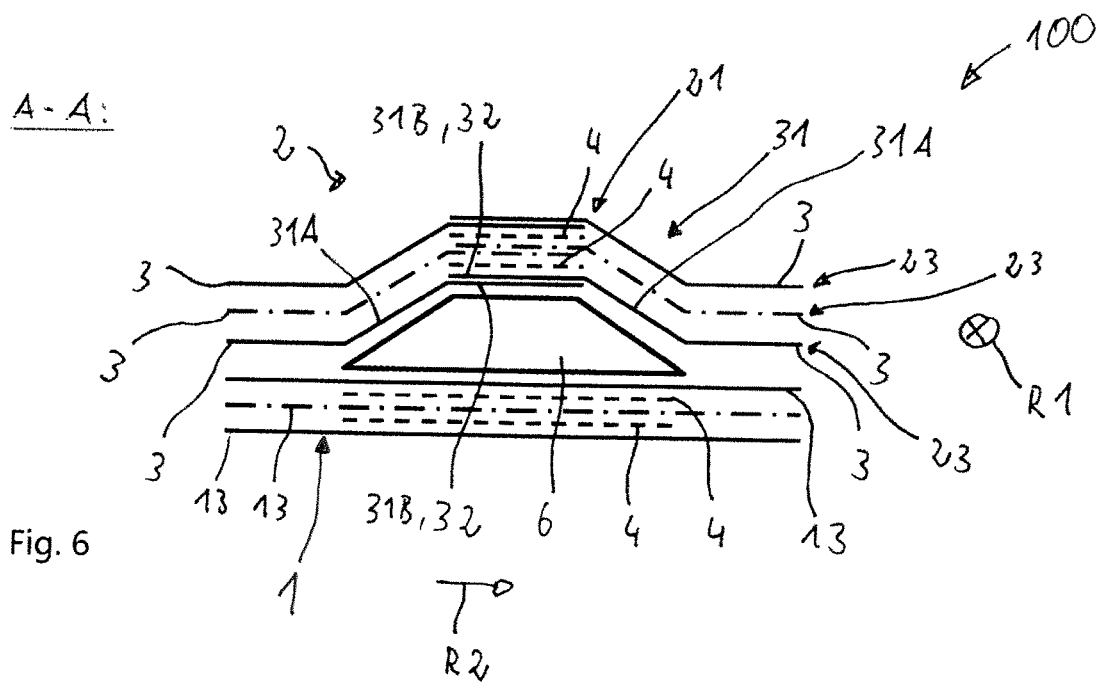
FIG. 6 shows a schematic sectional view of a fuselage component according to an example embodiment of the disclosure herein, the sectional view being produced in a section along the intersecting line A-A shown in FIG. 5.
Figure 7:
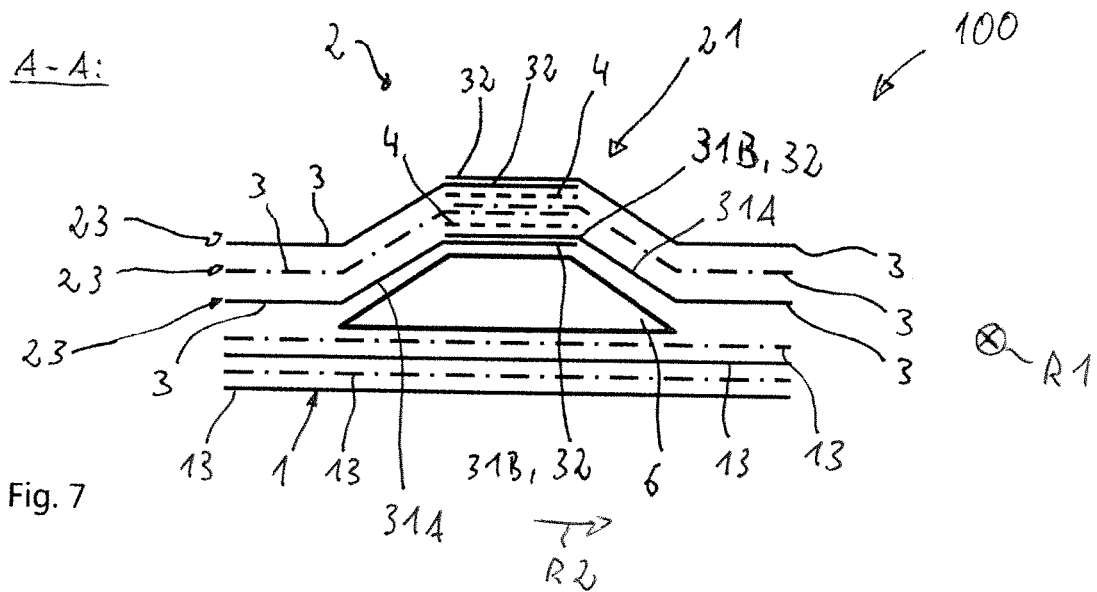
FIG. 7 shows a schematic sectional view of a fuselage component according to an example embodiment of the disclosure herein, the sectional view being produced in a section along the intersecting line A-A shown in FIG. 5.

The fuselage component 100 illustrated by way of example in FIG. 5 can be produced in particular in the manner described above. FIGS. 6 and 7 each illustrate a sectional view of the fuselage component 100, which is produced in a section through a stiffening profile 21, 22. The sectional view illustrated by way of example in FIGS. 6 and 7 is produced in a section along the line A-A, shown in FIG. 5, through a first stiffening profile 21.

As can be seen in FIGS. 6 and 7, the web sections 31B of the profile edges 31 of in each case two shaped parts 3 are in particular arranged in an overlapping manner. In particular, the web sections 31B can be arranged completely overlapping, as is illustrated in FIGS. 6 and 7. As can be clearly seen in FIGS. 6 and 7, the overlapping of the step-shaped profile edges 31 defines an approximately Ω-shaped cross-sectional shape of the stiffening profile 21, within which the optional foam core 6 is arranged. As is furthermore illustrated in FIGS. 6 and 7, an optional load-bearing tape 4 can be arranged on each of the two overlapping web sections 31B of the profile edge 31. Of course, a plurality of load-bearing tapes 4 can also be provided lying one on top of another.

The reinforcing structures 2 illustrated by way of example in FIGS. 6 and 7 have in each case three layers 23 of shaped parts 3 lying one on top of another. A respective layer 23 is formed here by at least two shaped parts 3, the profile edges 31 of which are arranged overlapping, as has already been described. As can furthermore be seen in FIGS. 6 and 7, the optional load-bearing strips 4 are each arranged between two layers 23 adjacent to each other on two overlapping web sections 31B of the profile edge 31 of a respective layer 23. In the reinforcing structures 2 illustrated by way of example in FIGS. 6 and 7, the shaped parts 3 of the individual layers 23 each have a woven fabric or laid fabric with reinforcing fibers extending perpendicularly to one another. In layers 23 adjacent to one another, the reinforcing fibers run in different directions. For example, the reinforcing fibers of the shaped parts 3, illustrated as a solid line in FIGS. 6 and 7, each extend in a direction of +/−45 degrees relative to the plane of the image, and the reinforcing fibers of the shaped parts 3 illustrated as a chain-dotted line in FIGS. 6 and 7 can each extend in a direction of 0/90 degrees relative to the plane of the image. The optional load-bearing tapes 4 are illustrated schematically as dashed lines and can in particular have unidirectionally extending reinforcing fibers.

As furthermore illustrated by way of example in FIGS. 6 and 7, the fiber layers 13 of the shell part 1 can also each have a woven fabric or laid fabric with reinforcing fibers extending perpendicularly to one another. As is shown by way of example in FIG. 6, a load-bearing tape 4 can be arranged in each case between two mutually adjacent fiber layers 13 in the region of the reinforcing profile 21. A plurality of load-bearing tapes 4 can optionally also be arranged stacked one above another here.

The shell part 1 illustrated by way of example in FIG. 6 has a total of three fiber layers 13 and two load-bearing tapes 4 arranged between the fiber layers 13. In the fiber layers 13 illustrated as solid lines in FIG. 6, the reinforcing fibers extend in a direction of +/−45 degrees relative to the plane of the image, and the reinforcing fibers of the fiber layer 13 illustrated as a chain-dotted line extend in a direction of 0/90 degrees relative to the plane of the image. The load-bearing tapes 4 arranged in between have unidirectional reinforcing fibers.

The shell part 1 illustrated by way of example in FIG. 7 has a total of four fiber layers 13, wherein, in contrast to FIG. 6, no load-bearing tapes 4 are provided in the shell part 1. In FIG. 7 too, reinforcing fibers of fiber layers 13 adjacent to one another extend in different directions. In the fiber layers 13 illustrated as solid lines in FIG. 7, the reinforcing fibers extend in a direction of +/−45 degrees relative to the plane of the image, and the reinforcing fibers of the fiber layer 13 illustrated as a chain-dotted line extend in a direction of 0/90 degrees relative to the plane of the image.

Figure 8:
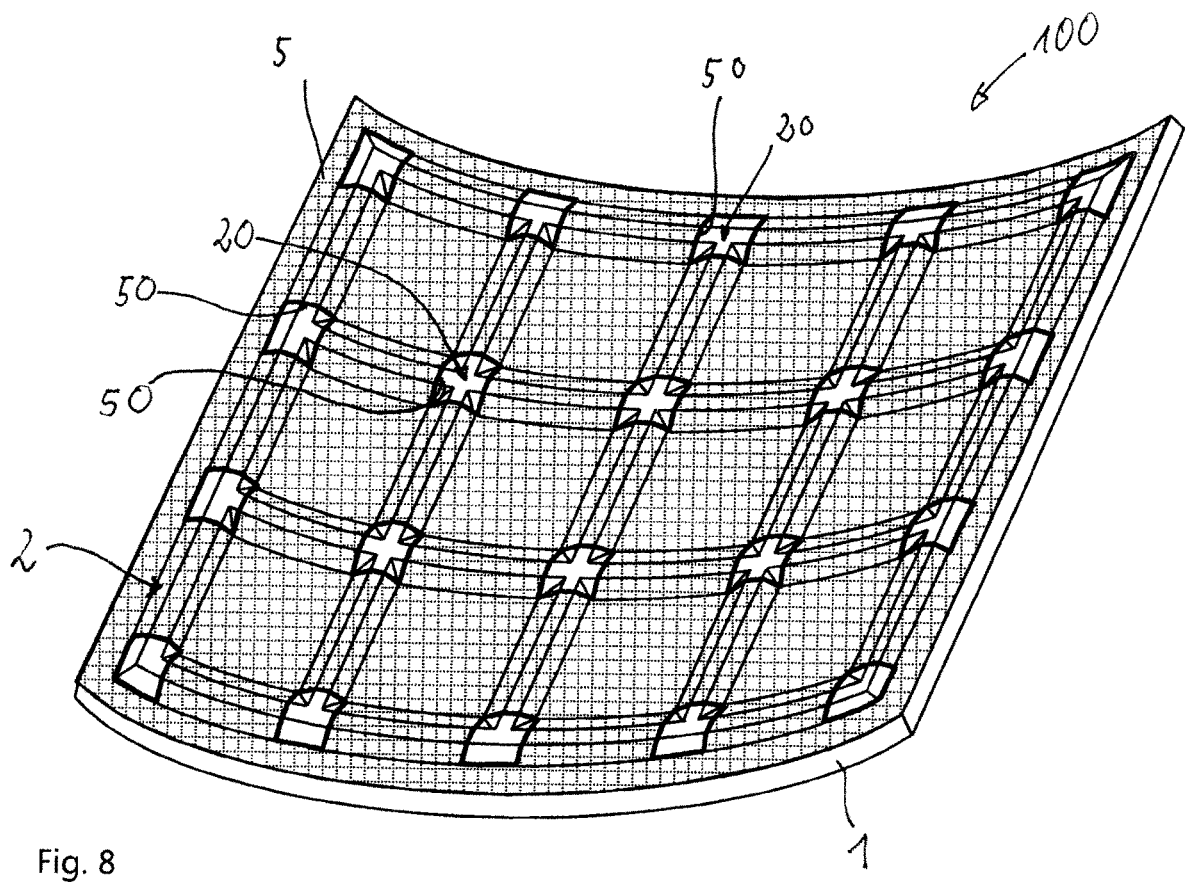
FIG. 8 shows a schematic illustration of a fuselage component according to an example embodiment of the disclosure herein in a perspective view.

FIG. 8 shows by way of example a fuselage component 100, the stiffening structure 2 of which has a flat covering layer 5 composed of a fiber composite material. The covering layer 5 can be placed, for example, onto the arrangement, illustrated in FIG. 3, of shaped parts 3 and load-bearing tapes 4 or following the optional formation of further layers 23 of shaped parts 3. The covering layer has recesses 50 in the region of the intersections 20. This facilitates the deformation of the covering layer 5 necessary for placing the covering layer 5 onto the shaped parts 3. The covering layer 5 can be connected to the shaped parts 3 in particular during the consolidation of the latter.

Figure 9:
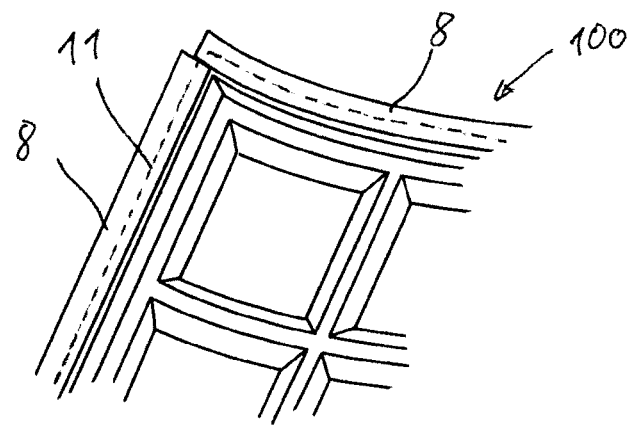
FIG. 9 shows a schematic partial view of a fuselage component according to an example embodiment of the disclosure herein.

FIG. 9 shows by way of example a fuselage component 100 which has an optional connecting strip 8 which serves for connecting a plurality of fuselage components 100 to one another. The connecting strip 8 is connected to the inner surface 1a of the shell part 1. For example, the connecting strip 8 can likewise be formed from a fiber composite material and can be integrally formed on the shell part 1 during the consolidation of the latter. As is illustrated schematically in FIG. 9, the connecting strip extends along a circumferential edge 11 of the shell part 1 and protrudes above the latter. In order to connect second fuselage components 100, the latter can be arranged overlapping by their connecting strips 8, or the connecting strip 8 of one of the fuselage components 100 overlaps an edge region of the shell part 1 of the further fuselage component 100. The connecting strips 8 can be adhesively bonded, welded, riveted, screwed or connected in a similar manner to the connecting strip 8 or to the edge region of the shell part 1 of the further fuselage component 100.

Figure 10:
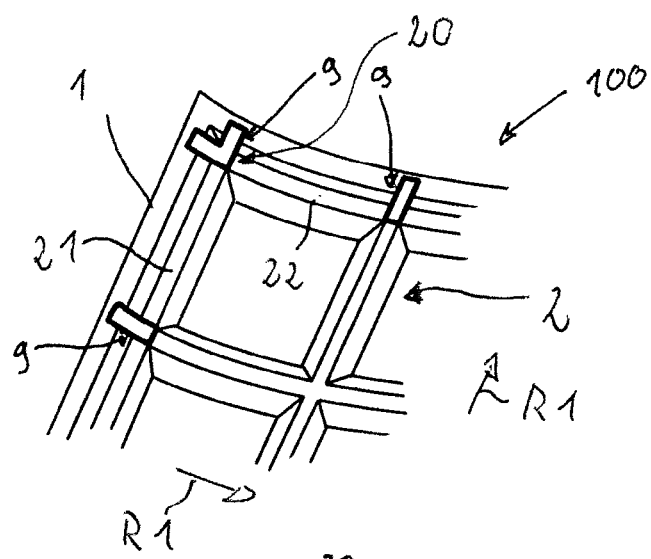
FIG. 10 shows a schematic partial view of a fuselage component according to a further example embodiment of the disclosure herein.

The fuselage component 100 shown by way of example in FIG. 10 has an optional profile coupling structure 9. The profile coupling structure 9 serves for the mechanical, force-conducting connection of stiffening profiles 21, 22 of interconnected fuselage components 100. The profile coupling structure 9 can be designed in particular as a strip or bracket and can be formed, for example, from a fiber composite material. The profile coupling structure 9 can be arranged in particular between individual layers 23 of the stiffening structure 2 and can be connected to the layer. Alternatively, the profile coupling structure 9 can be fastened on the surface of the stiffening structure 2, as shown schematically in FIG. 10. The profile coupling structure 9 projects beyond an end of the respective stiffening profile 21, 22 with respect to the longitudinal extent of the respective stiffening profile 21, 22, as is illustrated schematically in FIG. 10. A profile coupling structure 9 which is arranged at an intersection 20 forming a corner of the stiffening structure 2 is designed here as a bracket which projects both over an end of the first stiffening profile 21 with respect to the first direction R1 and over a second end of the second stiffening profile 22 with respect to the second direction R2.

Figure 11:
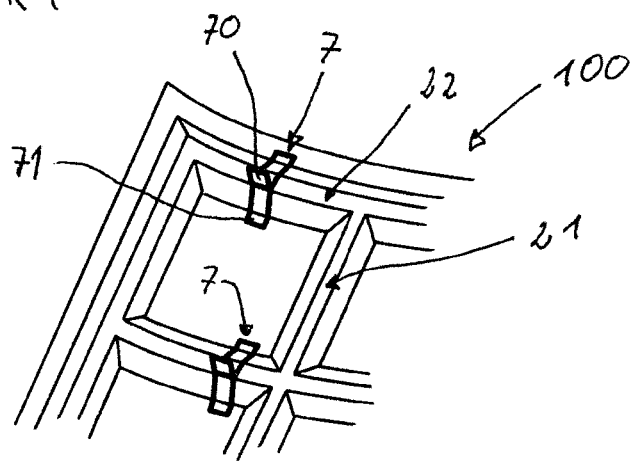
FIG. 11 shows a schematic partial view of a fuselage component according to a further example embodiment of the disclosure herein.

FIG. 11 furthermore shows a fuselage component 100 with an optional connection structure 7 which serves for fastening interior trim parts (not illustrated), pipes (not illustrated) or the like. The connection structure 7 is connected to one of the stiffening profiles 21, 22 and has a tab 70 projecting from the respective stiffening profile 21, 22, as is illustrated by way of example in FIG. 11. The connection structure 7 can in particular have a bow-shaped profile section 71 which has a design corresponding to the cross-sectional shape of the respective stiffening profile 21, 22. As shown by way of example in FIG. 11, the profile section 71 can be placed onto the respective stiffening profile 71 or can be inserted between individual layers 23 of the stiffening profile 21, 22. The tab 70 is preferably formed integrally with the profile section 71. The connection structure 7 can be formed, for example, from a fiber composite material.

Figure 12:
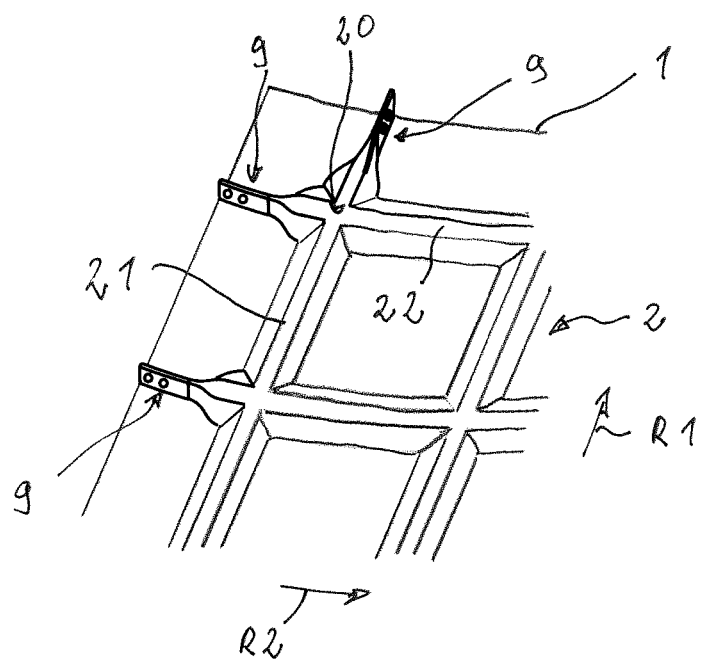
FIG. 12 shows a schematic partial view of a fuselage component according to a further example embodiment of the disclosure herein.

The fuselage component 100 shown by way of example in FIG. 12 has an optional profile coupling structure 9. In contrast to the fuselage component 100 illustrated by way of example in FIG. 10, the profile coupling structure 9 in FIG. 12 is formed in each case by an extension of the stiffening profile 21, 22. The extensions taper towards the ends along the first direction R1 or the second direction R2 in such a manner that a monolithic solid structure is formed locally there. Accordingly, the profile coupling structure 9 can generally be formed integrally with the stiffening profiles 21, 22. The monolithic regions forming the profile coupling structure 9 can be formed, for example, at least partially by the optional load-bearing tapes 4. If a foam core is used, the foam core does not extend into the monolithic end region of the profile coupling structure 9. The profile coupling structure 9 formed in this manner can be coupled to a profile coupling structure 9 of a further fuselage component 100 by bolt connections. The transition between the sandwich stiffening element and the monolithic coupling element is ideally designed in such a manner that the load-bearing tapes run therein without interruption.

The aircraft 200 illustrated by way of example in FIG. 13 has a fuselage 210 defining a longitudinal axis L200, wings 220 which are connected to the fuselage 210 and protrude laterally therefrom, a tail plane 230 arranged at an end of the fuselage 210 and a fin 240 likewise arranged at the end of the fuselage 210. As is illustrated schematically in FIG. 13, the fuselage 210 can have a plurality of the fuselage components 100 described above. A plurality of fuselage components 100 are arranged adjacent to one another here along the longitudinal axis L200. Furthermore, a plurality of the fuselage components 100 can be arranged adjacent to one another in a circumferential direction surrounding the longitudinal axis L200. The first stiffening profiles 21 extend here along the longitudinal axis L200, and the second stiffening profiles 22 along the circumferential direction. The individual fuselage components 100 can be coupled to one another, for example, via the optional connecting strips 8 described with reference to FIG. 9. The stiffening profiles 21, 22 of the individual fuselage components 100 can be coupled to one another, for example, via the profile coupling structures 9 described with reference to FIG. 10.

Although the disclosure herein has been explained above by way of example with reference to example embodiments, it is not restricted thereto, but rather can be modified in diverse ways. In particular, combinations of the above example embodiments are also conceivable.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Shell part
1a Inner surface
1b Outer surface
2 Stiffening structure
3 Shaped parts
4 Load-bearing tapes
5 Covering layer
7 Connection structure
8 Connecting strip
9 Profile coupling structure
11 Circumferential edge of the shell part
13 Fiber layers of the shell part
20 Intersection
21 First stiffening profile
22 Second stiffening profile
23 Layers of the stiffening structure
30 Base section
31 Profile edge
31A Wall section
31B Web section
31C Interruption
32 First profile sections
33 Second profile sections
50 Recesses
70 Tab
71 Profile section
100 Fuselage component
200 Aircraft
210 Fuselage
220 Wing
230 Tail plane
240 Fin L200 Longitudinal axis
R1 First direction
R2 Second direction
t1 Cross-sectional thickness of the shell part

The invention claimed is:

1. A fuselage component for an aircraft, comprising:
  a shell part of flat extent and composed of a fiber composite material; and
  a stiffening structure which is connected to an inner surface of the shell part and has a multiplicity of shaped parts composed of a fiber composite material;
  wherein the shaped parts each have a flat base section which extends along the inner surface of the shell part, and a step-shaped profile edge which extends in an encircling manner around the base section, wherein each of the shaped parts comprises an interruption in a region of an interruption corner;
  wherein the shaped parts are arranged with overlapping profile edges such that the overlapping profile edges form stiffening profiles intersecting at an intersection in a region of an intersection corner.

2. The fuselage component according to claim 1, wherein a load-bearing tape composed of a fiber composite material is connected to each stiffening profile and extends beyond the intersection.

3. The fuselage component according to claim 1, wherein the base sections of the shaped parts are of rectangular design, wherein the profile edge of a respective shaped part in each case has two mutually opposite first profile sections which extend in a first direction, and two mutually opposite second profile sections which extend between the first profile sections in a second direction, wherein the first profile sections of in each case two shaped parts that are adjacent in the second direction overlap such that they form a first stiffening profile extending in the first direction, wherein the second profile sections of in each case two shaped parts that are adjacent in the first direction overlap such that they form a second stiffening profile which extends in a second direction and intersects the first stiffening profile at an intersection, and wherein a load-bearing tape is connected to each of the overlapping first profile sections and extends beyond the intersection and a load-bearing tape is connected to each of the overlapping second profile sections and extends beyond the intersection.

4. The fuselage component according to claim 1, wherein the stiffening structure is formed at least in regions with a plurality of layers lying one on top of another of shaped parts, wherein the profile edges of adjacent shaped parts of a respective layer overlap, and wherein a respective load-bearing tape is arranged between two adjacent layers, the load-bearing tape extending on the profile edges beyond the intersection.

5. The fuselage component according to claim 1, wherein the stiffening structure has a flat covering layer composed of a fiber composite material, wherein the covering layer lies against the shaped parts and has recesses in a region of the intersections.

6. The fuselage component according to claim 1, comprising:
  a foam core which is arranged between the stiffening profiles and the shell part.

7. The fuselage component according to claim 1, comprising:
  a connection structure which is connected to one of the stiffening profiles and has a tab projecting from the stiffening profile.

8. The fuselage component according to claim 1, comprising:
a connecting strip which is connected to the inner surface of the shell part, extends along a circumferential edge of the shell part and projects above the latter.

9. The fuselage component according to claim 1, comprising:
a profile coupling structure which is connected to one of the stiffening profiles and protrudes beyond an end of the respective stiffening profile with respect to a longitudinal extent of the respective stiffening profile.

10. An aircraft comprising a fuselage which has at least one fuselage component according to claim 1.

11. A method for producing a fuselage component, comprising:
Forming a stiffening structure from a multiplicity of shaped parts composed of a fiber composite material and each having a flat base section and a step-shaped profile edge, wherein the profile edge extends in an encircling manner around the base section, wherein the profile edge of each of the shaped parts comprises an interruption in a region of an interruption corner, and wherein the shaped parts are arranged such that the profile edges overlap and form stiffening profiles intersecting at an intersection in a region of an intersection corner;
placing an inner surface of a shell part of flat extent and composed of a fiber composite material onto the base sections of the shaped parts of the stiffening structure; and
connecting the shell part and the stiffening structure.

12. The method according to claim 11, wherein a load-bearing tape is connected to each stiffening profile and extends beyond the intersection.

13. The method according to claim 11, wherein the base sections of the shaped parts are of rectangular design, wherein the profile edge has two mutually opposite first profile sections which extend in a first direction, and two mutually opposite second profile sections which extend between the first profile sections in a second direction, wherein the first profile sections of in each case two shaped parts are arranged overlapping such that they form a first stiffening profile extending in the first direction, wherein the second profile sections of in each case two shaped parts are arranged overlapping such that they form a second stiffening profile which extends in the second direction and intersects the first stiffening profile at the intersection, and wherein load-bearing tapes composed of a fiber composite material and each extending beyond the intersections are connected to the first profile sections and to the second profile sections.

14. The method according to claim 11, wherein, for supporting the stiffening structure, a foam core is arranged between the stiffening profiles and the shell part.

15. The method according to claim 11, wherein the shaped parts are arranged as semi-finished fiber products on the shell part and, following the arrangement, are infiltrated with a matrix material.

16. The method according to claim 11, wherein the shaped parts are arranged as semi-finished products composed of a fiber composite material, which has reinforcing fibers embedded in a matrix material, on the shell part.

* * * * *